United States Patent
Rüegg

(10) Patent No.: US 10,359,004 B2
(45) Date of Patent: Jul. 23, 2019

(54) PULSE DETONATION DRIVE

(71) Applicant: Explotechnik AG, Waltenschwil (CH)

(72) Inventor: Hans Rüegg, Waltenschwil (CH)

(73) Assignee: EXPLOTECHNIK AG, Waltenschwil (CH)

(*) Notice: Subject to any disclaimer, the term of this patent is extended or adjusted under 35 U.S.C. 154(b) by 181 days.

(21) Appl. No.: 15/311,870

(22) PCT Filed: May 18, 2015

(86) PCT No.: PCT/CH2015/000077
§ 371 (c)(1),
(2) Date: Nov. 17, 2016

(87) PCT Pub. No.: WO2015/176190
PCT Pub. Date: Nov. 26, 2015

(65) Prior Publication Data
US 2017/0082069 A1    Mar. 23, 2017

(30) Foreign Application Priority Data
May 21, 2014   (CH) .......................................... 776/14

(51) Int. Cl.
F02K 1/15 (2006.01)
F02K 1/08 (2006.01)
F02K 7/06 (2006.01)
F02K 7/02 (2006.01)
(Continued)

(52) U.S. Cl.
CPC .................. *F02K 7/06* (2013.01); *F02K 1/08* (2013.01); *F02K 1/15* (2013.01); *F02K 7/02* (2013.01);
(Continued)

(58) Field of Classification Search
CPC ..... F02K 7/06; F02K 9/86; F02K 1/15; F02K 9/97; F02K 1/08; F02K 7/02; F02K 9/58;
(Continued)

(56) References Cited

U.S. PATENT DOCUMENTS 2,390,161 A * 12/1945 Mercier .................... F02K 1/36
123/564
2,515,644 A *  7/1950 Goddard .................. F02K 7/06
244/74
(Continued)

FOREIGN PATENT DOCUMENTS

EP        1 482 162        12/2004
EP        2 319 936         5/2011

OTHER PUBLICATIONS

English translation of the International Preliminary Report on Patentability dated Nov. 22, 2016, Application No. PCT/CH2015/000077.

*Primary Examiner* — Ted Kim
(74) *Attorney, Agent, or Firm* — Rankin, Hill & Clark LLP

(57) ABSTRACT

A device for the repeated production of explosions includes an explosion space, a feed conduit for feeding a flowable, explosive material, a discharge opening for the directed discharge of a gas pressure produced by the ignition of the explosive material in the explosion space, and a movable closure element for the partial or complete closure of the discharge opening. The device includes an exit nozzle with a nozzle entry area and a nozzle exit area, as well as an actuation device. The actuation device is adapted, after an opening of the discharge opening and an outflow of explosion gases through the exit nozzle, to adjust an area ratio between the nozzle entry area and the nozzle exit area. The area ratio at least approximately follows an ideal area ratio for the production of a maximal exit speed of the explosion gases, in dependence on the pressure in the explosion space.

12 Claims, 2 Drawing Sheets

(51) Int. Cl.
*F02K 9/44* (2006.01)
*F02K 9/52* (2006.01)
*F02K 9/58* (2006.01)
*F23R 7/00* (2006.01)
*F02K 9/86* (2006.01)
*F02K 9/97* (2006.01)
*F02B 71/06* (2006.01)

(52) U.S. Cl.
CPC .............. *F02K 9/44* (2013.01); *F02K 9/52* (2013.01); *F02K 9/58* (2013.01); *F02K 9/86* (2013.01); *F02K 9/97* (2013.01); *F23R 7/00* (2013.01); *F02B 71/06* (2013.01); *F05D 2220/323* (2013.01); *F05D 2220/80* (2013.01); *F05D 2240/35* (2013.01); *F05D 2250/41* (2013.01)

(58) Field of Classification Search
CPC ..... F02K 9/52; F02K 9/44; F23R 7/00; F05D 2240/35; F05D 2220/80; F05D 2220/323; F05D 2250/41; F02B 71/06
See application file for complete search history.

(56) References Cited

U.S. PATENT DOCUMENTS

| | | |
|---|---|---|
| 4,726,184 A | 2/1988 | Russell |
| 5,345,758 A * | 9/1994 | Bussing ............... B01J 3/08 60/39.38 |
| 5,394,690 A * | 3/1995 | Arszman ............... F02K 9/86 60/233 |
| 5,797,260 A | 8/1998 | Koppel et al. |
| 5,941,062 A | 8/1999 | Koppel et al. |
| 6,964,154 B1 * | 11/2005 | Sackheim ............. F02K 9/56 60/224 |
| 7,062,901 B1 | 6/2006 | Johnson |
| 7,849,695 B1 * | 12/2010 | Cover ................... F02K 9/805 60/242 |
| 2008/0098711 A1 * | 5/2008 | DiSalvo ................ F02K 9/58 60/211 |
| 2011/0180020 A1 | 7/2011 | Ruegg |
| 2013/0298523 A1 * | 11/2013 | Sims ..................... F02K 1/00 60/200.1 |

\* cited by examiner

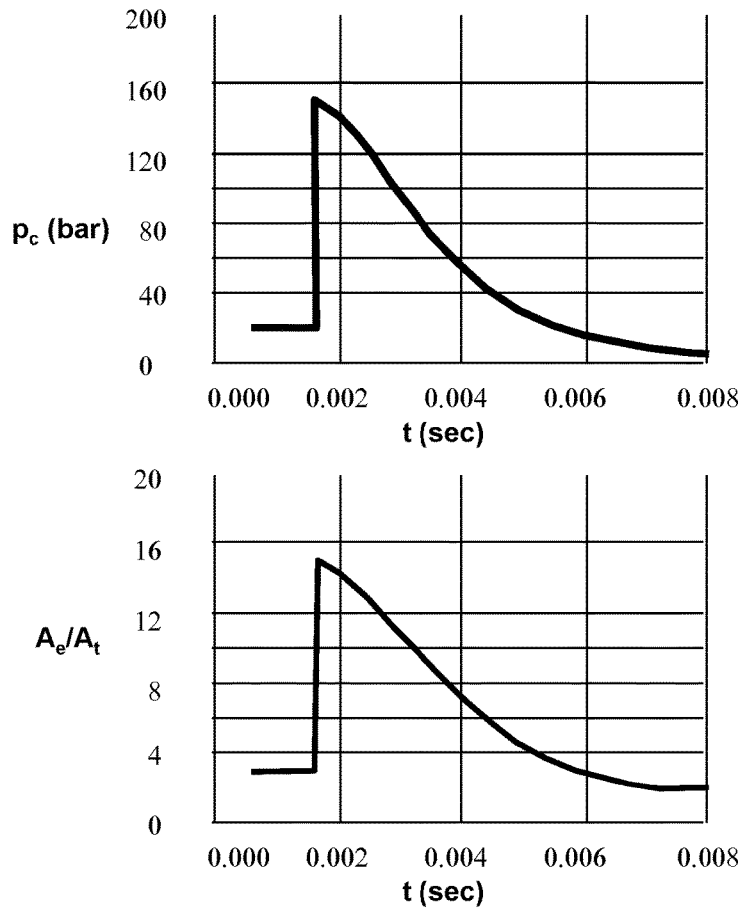
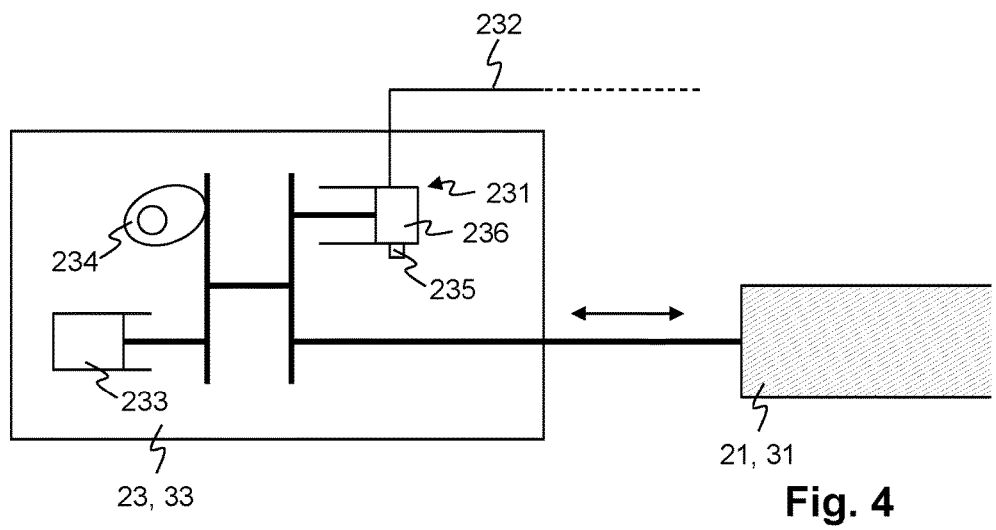
Fig. 4

PULSE DETONATION DRIVE

BACKGROUND OF THE INVENTION

Field of the Invention

The invention relates to a device and to a method, for the repeated production of explosions for the production of thrust, in particular in aircraft.

Description of Related Art

Propulsion machines, so-called pulse detonation engines (PDE) are known, with which the temperature and pressure increase of isochoric combustion at constant volume, i.e. by way of explosions, is applied instead of a continuous combustion at constant pressure. A maximisation of the kinetic energy of the outflowing combustion gases is strived for, which is in contrast to the explosion motor, in which the produced pressure drives the piston in a direct manner. Thus, the exhaust gases, which are produced by the explosion, are to be accelerated to maximum speed for the production of maximum thrust, and applied for propulsion purposes. The Holzwarth turbine as well as pulse jet engines which produce thrust at a high frequency by way of explosions have become known.

U.S. Pat. No. 7,062,901, according to one embodiment (FIG. 4) discloses a single detonation chamber and a nozzle with a flexible side wall. An exit area and/or an entry area of the nozzle should be variable by way of a cam. The aim is to ensure an optimal expansion. Useful details concerning the design of such a flexible side wall, however, are not given. An explosion chamber is filled with an explosive gas, at atmospheric pressure, and this is ignited, on operation. A pressure increase does not therefore take place before the ignition.

A method for the production of pressure impulses by way of explosions is described in the European patent application EP 2 319 036 A2 (and likewise US 2011/180020 A1). Thereby, a mixture of oxidant and fuel is ignited in a container closed by a valve, and an explosion produced. The valve is opened shortly before the ignition, and the pressure wave of the explosion can be led to its designated location via the exit opening. The apparatus, also called explosion generator (EG), is used today for the cleaning of contaminated boilers.

U.S. Pat. Nos. 5,797,260, and 5,941,062 which is derived from this, describe a pulsating propulsion/drive with a movable piston. The piston is moved in the direction of the nozzle by way of the pressure of a feed fuel, and fed to an injection chamber separated from a combustion chamber by the piston is opened by way of this. The fuel is catalytically converted by injection channels in the piston and by a catalytic bed, then gets into the combustion chamber and ignites. The piston is moved back away from the nozzle by way of the arising explosion. Fuel is driven through the injection channels to an increased extent on account of this, in particular after the feed is closed again, by which means the pressure in the combustion chamber rapidly increases. The cycle can be repeated after the reduction of the pressure in the combustion chamber. According to one embodiment (FIG. 7), a projection of the piston can close the nozzle throat to a greater or lesser extent. The operation of the propulsion is supposed to be able to be optimised by way of this, concerning which however no further details are given.

SUMMARY OF THE INVENTION

An object of the invention is to provide a device and a method, of the initially mentioned kind, which effect an improved conversion of the energy released by the explosion, into kinetic energy of the exhaust gas.

The device serves for the repeated production of explosions. It includes: an explosion space, a feed conduit for feeding a flowable, explosive material, a discharge opening for the directed discharge of a gas pressure produced by the ignition of the explosive material in the explosion space, and a movable closure element for the partial or complete closure of the discharge opening. Thereby, the device includes an exit nozzle with a nozzle entry area and a nozzle exit area, as well as an actuation device. The actuation device is designed to adjust an area ratio between the nozzle entry area and the nozzle exit area after an opening of the discharge opening and an outflow of explosion gases through the exit nozzle, the ratio at least approximately following an ideal area ratio for the production of a maximal exit speed of the explosion gases, in dependence on the pressure in the explosion space.

A pressure in the explosion space can be increased before the ignition thanks to the at least partly closable explosion space, which is in contrast to known pulsating propulsions. The pressure that arises with the explosion is proportional to the pressure before the ignition. Hence an accordingly greater pressure arises after the explosion due to the increased pressure before the explosion, and the exit speed of the exiting explosion gases can be increased by a multiple.

The invention realises a nozzle, in particular a convergent-divergent nozzle, which ensures that the optimal, ideal area ratio between the nozzle end (nozzle exit area) and the nozzle neck (nozzle entry area) is always set, which is to say adjusted, at least approximately, during the complete outflow time.

In contrast to the known explosion generator of the European patent application EP 2 319 036 A2, the conversion of the energy, which is released with the explosion, into kinetic energy, is at least approximately optimised.

A flowable, explosive substance or a flowable, explosive mixture which is formed by mixing components which per se are preferably not explosive is introduced into the explosion chamber. The flowable substances and/or substance mixtures for example are gaseous, fluid, powdery, dust-like or powder-like or a mixture of such component substances. Typically, one component is a fuel and another component an oxidiser. A mixture for example consists of two gases under pressure. Here and hereinafter, all variants and possible combinations of substances and mixtures are simply termed flowable, explosive material, without this being seen as a restriction to an individual substance or to a certain mixture.

Higher combustion temperatures are achieved with isochoric combustion at constant volume than with combustion at constant pressure. Additionally, an enormous pressure increase is achieved with the explosive combustion. A pressure increase by a factor of 7.5 is achieved for example with a stoichiometric combustion of air and natural gas at constant volume, i.e. the peak pressure in the explosion space is approx. 75 bar with a preliminary pressure of 10 bar of the mixture. The aim with such applications with isochoric combustion is to produce a gas jet that leaves the explosion space at maximum speed.

This however is only possible for a very defined pressure in the case of supercritical, supersonic nozzles with a fixed nozzle geometry: However, the pressure in the explosion space drops as a result of adiabatic decompression and dropping density, due to the outflow of the explosion gases out of the explosion space. Thereby, at the most, the critical speed of sound is achieved at the narrowest location.

A convergent-divergent nozzle (Laval nozzle) can be used in the case that an orderly conversion of thermal energy into flow energy is to be achieved. Thereby, the flow speed is accelerated along the flow path from subsonic speed in the explosion space to sonic speed in the narrowest cross section (the nozzle neck) and to supersonic speed in the divergent nozzle part. The nozzle cross section is continuously widened in the divergent nozzle part. The pressure thereby likewise continuously drops up to the nozzle end. The flow reaches the maximal exit speed when the exit pressure=ambient pressure. The ideal area ratio $\varepsilon = A_e/A_t$ between the nozzle end and the nozzle neck is computed according to the formula:

$$\varepsilon = \frac{A_e}{A_t} = \frac{\left(\frac{2}{\kappa+1}\right)^{\frac{1}{\kappa-1}} \left(\frac{p_c}{p_e}\right)^{\frac{1}{\kappa}}}{\sqrt{\frac{\kappa+1}{\kappa-1}\left(1-\left(\frac{p_e}{p_c}\right)^{\frac{\kappa-1}{\kappa}}\right)}}$$

Thereby, $p_c$ is the combustion chamber pressure in the explosion space or the nozzle entry pressure, $p_e$ the pressure at the nozzle end or the nozzle exit pressure, $A_e$ the nozzle exit area, $A_t$ the nozzle entry area and x the isentropic exponent.

The area ratio $\varepsilon$ would also have to drop, since the combustion chamber pressure drops as a result of the outflow of the combustion gases. A maximal combustion temperature of approx. 2400° C. and an explosion pressure of approx. 150 bar is achieved by way of the explosion of a stoichiometric mixture of air and hydrogen for example at 20 bar preliminary pressure at 300° K. During the outflow, the pressure in the explosion space drops until a pressure equalisation with the surroundings occurs. The ideal area ratio $\varepsilon$ should therefore ideally be continuously reduced from max. 15 to approx. 2 according to the above formula, i.e. the nozzle area ratio should ideally be able to be varied by the factor 7.5, in order to always achieve the maximal gas speed at the nozzle end during the outflow, at all times.

FIG. 3 shows a corresponding time course of a pressure $p_c$ in an explosion chamber and an ideal area ratio $\varepsilon = A_e/A_t$ which results from this.

The nozzle, for example a convergent-divergent nozzle, should therefore ensure that the optimal, ideal area ratio between the nozzle end and the nozzle neck is set at least approximately, during the complete discharge time.

Nozzles of the common construction type, which are applied for rocket engines, have a fixed geometry. It is not necessary for their geometry to be able to be adjusted since the power is not changed during the operation. Aircraft engines with an afterburner require an adjustable nozzle, since the narrowest nozzle cross section needs to be enlarged for afterburner operation. Adjustable nozzles are also known with gas turbines. With these applications, the nozzles are adjusted in each case in accordance with the release of power, but this always being the case in a very slow manner, i.e. in the second to minute range.

In contrast to this, the discharge out of the explosion volume of an impulse or explosion generator at the most requires a few milliseconds, i.e. the nozzle geometry must be able to be adjusted very rapidly in accordance with the outflow (discharge) speed and the explosion frequency. High specific powers of the generator are desired, and high explosion frequencies are necessary in order to attain this, i.e. frequencies of up to 50 Hz are strived for.

The thrust F of an engine is computed as:

$$F = \dot{m} \cdot w_e + A_e(p_e - p_a)$$

wherein $\dot{m}$=mass flow in the nozzle neck
$w_e$=nozzle exit speed
$p_a$=ambient pressure A nozzle that is too short and with too small an area ratio $\varepsilon$ wastes energy, since the maximal exit speed is not achieved. A nozzle that is too long and with too large an area ratio $\varepsilon$ leads to an over-expansion, and the thrust is braked by the counter-pressure. Basically, in each case precisely one optimal area ratio $\varepsilon$ is given, at given combustion chamber pressures and ambient pressures.

In an embodiment, this object is achieved by an annular nozzle with a tubular outer part and with a concentric, essentially conical inner part that can be adjusted to one another in the axial direction. Their contour at least approximately forms an ideal Laval nozzle at all times during the outflow. An outer geometry of the nozzle with a neck diameter and exit diameter is thereby preferably preliminarily set and is designed for the maximal thrust which can be achieved. The concentric inner part of the nozzle is movable and changes the nozzle neck area or the nozzle entry area at least approximately according to the ideal area ratio.

There are different convergent-divergent nozzle shapes. Common, for example, are a conical nozzle and a bell nozzle.

In an embodiment, a control valve is arranged for the variation of the nozzle entry area, and the actuation device is a control valve drive, which controls a movement of the control valve for adjusting/setting the nozzle entry area, at least approximately according to the mentioned, ideal area ratio.

Thereby, the desired area ratio is therefore achieved by way of variation of the nozzle entry area.

The control valve can thereby be moved by way of an axial movement along a longitudinal axis of the exit nozzle. The exit nozzle can be shaped in an essentially rotationally symmetrical manner; an axis of symmetry of this rotation symmetry is thereby equal to the longitudinal axis.

In an embodiment, the control valve includes a control valve needle, and the nozzle entry area is determined by the position of the control valve needle with respect to the discharge opening.

In an embodiment, the control valve needle has an outer contour, which tapers to a valve tip, in particular has an at least approximate conical outer contour.

In an embodiment, the control valve and a valve seat form a convergent-divergent part of the exit nozzle.

In an embodiment, the actuation device includes a drive means for the drive of an opening movement of the control valve, in particular by way of the drive means being realised by an auxiliary explosion device, in which an auxiliary explosion produces a force assisting the opening movement.

Details with regard to the drive with such an auxiliary explosion device are described in the initially mentioned EP 2 319 036 A2. In particular, according to an embodiment, it is possible to synchronise the explosion in the auxiliary explosion device with that in the explosion chamber, by way of a conduit, also called delay conduit.

A further force or force component that assists the opening movement can arise due to the recoil of the outflowing explosion gases against the control valve.

In an embodiment, the actuation device includes a braking means for the delay of an opening movement of the control valve, in particular by way of the braking means being realised by way of a gas pressure spring or by way of a cam shaft or by way of a gas pressure spring in combination with a cam shaft.

The drive means and braking means can also be realised by a single device, for example by way of a crank drive.

A flywheel can be present for compensating a rotation movement of the cam shaft or of the crank drive, in the case of the application of a cam shaft or a crank drive.

In an embodiment, the closure element is configured to temporarily completely close the discharge opening. With this, it is possible to increase the pressure in the explosion chamber to above ambient pressure before the ignition.

In an embodiment, the control valve acts as a closure element for the partial or complete closure of the discharge opening. A simple design with few moved parts is possible due to this.

In an embodiment, a closure valve acting additionally to the control valve and acting as a closure element for the partial or complete closure of the discharge opening is present. The control valve can be protected from wear in this manner.

A closure valve drive for driving and/or braking the closure valve can be designed in the same manner as one of the described embodiments for the control valve drive.

The closure valve can thereby be moved along the longitudinal axis of the exit nozzle by way of an axial movement.

In an embodiment, the control valve and the closure valve are arranged concentrically to one another.

The closure valve, for example, can enclose the control valve and form an annular valve in the region of the discharge opening. A high thermal and mechanical loading is absorbed by the closure valve and not by the control valve, on account of this.

In other embodiments, the area ratio is achieved by way of variation of the nozzle exit area. This can be effected by way of varying the shape or the contour of the nozzle over time, synchronously with the repeated explosions.

In an embodiment, this is achieved by way of displacing the exit nozzle or a part of the exit nozzle relative to the control valve, in particular relative to the tapering part of the control valve, thus of the control valve needle. What is present is therefore: a device according to at least one of the preceding embodiments, wherein an adjustable nozzle part is arranged for the variation of the nozzle exit area, and a nozzle adjustment device is configured to control a movement of the adjustable nozzle part for adjusting/setting the nozzle exit area at least approximately in accordance with the mentioned ideal area ratio. Thereby, the adjustable nozzle part can be displaced in the axial direction relative to the control valve.

The nozzle adjustment device can thereby be realised in the same manner as one of the embodiments of control valve drives or closure valve drives, which are described here.

The change of the nozzle entry area is coordinated with that of the nozzle exit area, in the case that the nozzle entry area is varied.

The method for the repeated production of explosions includes the repeated implementation of the following steps, in particular in the specified sequence:

feeding a flowable, explosive material into an explosion space, wherein a discharge opening of the explosion space is at least partly closed by way of a movable closure element, and producing an overpressure in the explosion space with respect to an ambient pressure;

opening the discharge opening;

igniting the explosive material in the explosion space;

discharging explosion gases through the discharge opening and a exit nozzle;

adjusting an area ratio between the nozzle entry area and the nozzle exit area, of the exit nozzle, said area ratio at least approximately following an ideal area ratio for the production of a maximal exit speed of the explosion gases, in dependence on the dropping pressure in the explosion space;

at least partially closing the discharge opening by way of the movable closure element.

In an embodiment, the step of opening the discharge opening take place before the step of ignition. A thermal loading of the valve seat is reduced by way of an ignition, which is delayed in such a manner. The opening is effected by way of opening the control valve or the closure valve, depending on the embodiment.

The delay between the opening of the discharge opening (for example by way of the auxiliary explosion for the drive of the respective valve) and the ignition in the explosion space typically lies in the range of fractions of milliseconds to a few milliseconds, for example between 0.1 and 10 milliseconds, e.g. between 0.5 and 1 millisecond.

In an embodiment, the ignition of the explosive material in the explosion space is effected by way of leading an explosion out of an auxiliary explosion device through a conduit to the explosion space. The following problem can be avoided by way of this: with the use of air as an oxidiser, a transition from a deflagration to detonation (deflagration-detonation time, DDT) can take a considerably long time and is dependent on the ignition energy. Thereby, with a direct ignition of the main explosion with a spark-plug, its can occur that a detonation with a rapid pressure increase cannot be produced at all in the explosion chamber, or that the DDT lasts too long and a large portion of the pressure gases have already left the explosion space before the formation of the main explosion. If an auxiliary explosion device is used, for example, together with a preliminary explosion chamber, and the explosion or detonation is transmitted by a conduit (a pipe) of the ignition to the explosion space, then the energy that is introduced in the explosion space is a multiple greater than with a spark plug, and a detonation is reliably effected. The auxiliary explosion device can be applied only for ignition in the explosion space in the described manner, or it can also serve as a drive or part of the drive of the control valve or of the closure valve.

BRIEF DESCRIPTION OF THE DRAWINGS

The subject-matter of the invention is explained in more detail by way of preferred embodiment examples, which are represented in the accompanying drawing. Represented schematically are:

FIG. 3 a pressure in an explosion chamber over the course of time, and an ideal area ratio which results therefrom; and FIG. 4 by way of example, an inner construction of a control valve drive or closure valve drive.

DETAILED DESCRIPTION OF THE INVENTION

Figure 1:
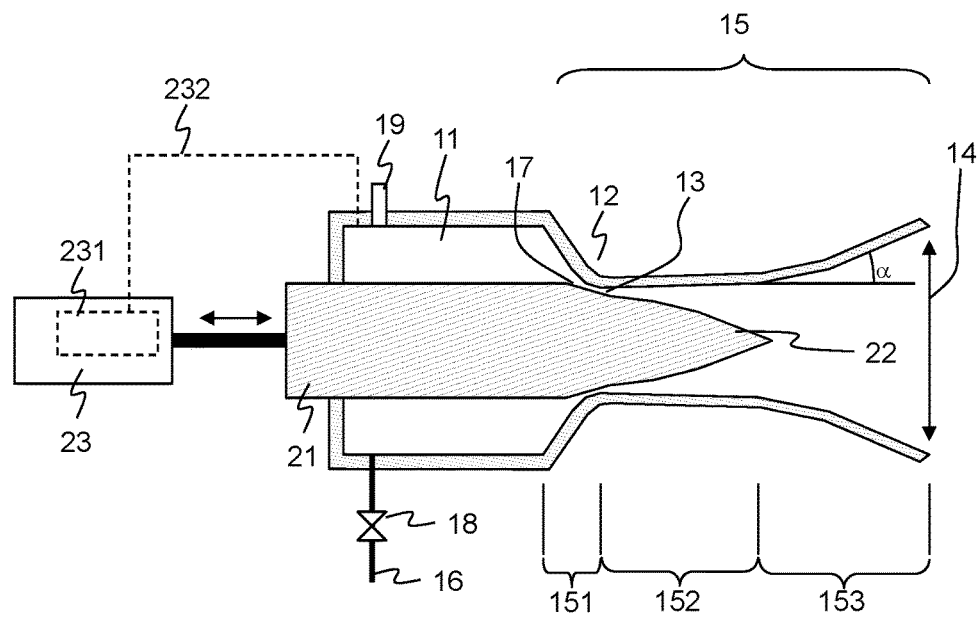
FIG. 1 an embodiment with a combined closure valve and control valve.

Basically, the same or equally acting parts, in the drawings are provided with the same reference numerals.

FIG. 1 shows a device for the repeated production of explosions: an explosion space 11 is fillable via a feed conduit 16 with a filling valve 18, with a flowable, explosive material, for example an explosive gas mixture. The material can be ignited and be made to explode by an ignition device 19, for example a spark plug. In another embodiment, the material in the explosion space 11 is ignited via a conduit or delay conduit 232, which is likewise filled with explosive material, by way of an explosion departing from an auxiliary explosion chamber of an auxiliary explosion device 231 and being led through the delay conduit 232.

An exit of the explosion space 11 leads through a discharge opening 17 and an exit nozzle 15. The exit nozzle 15 is a Laval nozzle with a convergent nozzle section 151, an adjustable, divergent nozzle section 152 and a fixed, divergent nozzle section 153. The adjustability of the adjustable, divergent nozzle section 152 is realised by an axially (thus along a longitudinal axis of the exit nozzle 15) adjustable control valve 21 with a control valve needle 22. The control valve needle 22 is arranged in the region of the adjustable, divergent nozzle section 152 and is designed per se in a tapering manner, for example in a conical manner. The nozzle area in the region of the control valve needle 22 increases in the direction of the nozzle exit area 14 on account of this, corresponding to the reduction of a cross section of the control valve needle 22. In a closed condition of the control valve 21, the control valve 21 on a valve seat 12 completely or at least approximately completely closes the discharge opening 17. The control valve 21 can therefore also serve as a closure valve.

With a movement of the control valve needle 22 away from the nozzle exit area 14, the cross section of the nozzle increases over time at every location of the adjustable, divergent nozzle section 152 and in the region of the discharge opening 17. It is particularly a nozzle neck area or nozzle entry area 13 in the region of the discharge opening 17 that increases over time.

The control valve 21 seals off the explosion space 11 with respect to the exit nozzle 15 during the filling of the explosion space 11 with explosive mixture of an oxidiser and fuel. An overpressure can be produced by way of this, with which in turn a high explosion pressure can be produced.

Figure 2:
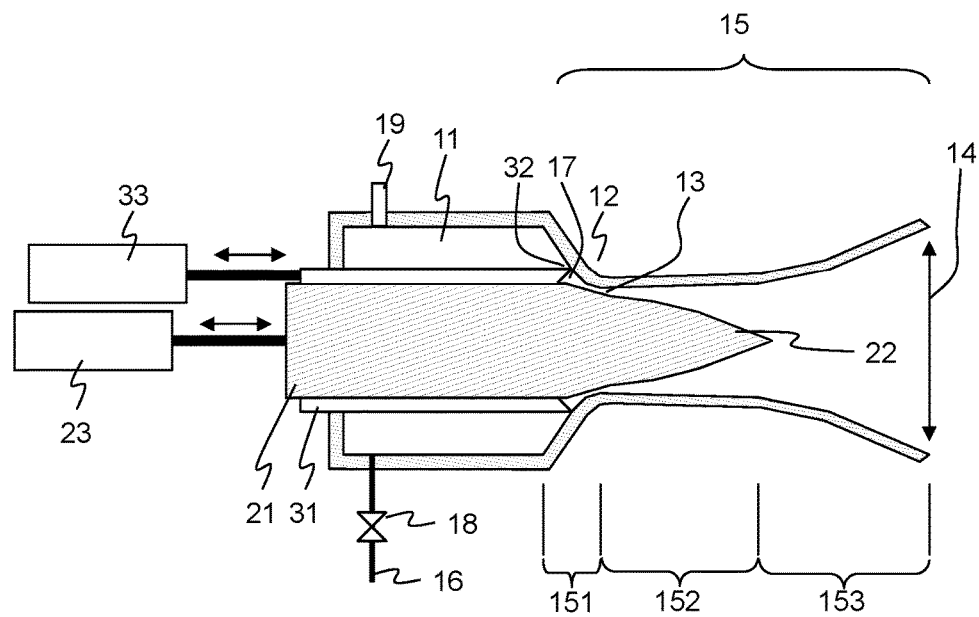
FIG. 2 an embodiment with a separate closure valve and control valve.

FIG. 2 shows an embodiment with a separate closure valve 31 and control valve 21. The remaining elements are the same as with FIG. 1. This variant is useful if the closure valve 31 is to be moved independently of the Laval valve or control valve 21, in a very rapid manner. This is particularly the case if the control valve 21 is driven with the help of an auxiliary explosion device 231, as is described in EP 2 319 036 A2 for example. The closure valve 31 can be moved separately from the control valve 21. A closure valve drive 33 of the closure valve 31 can be designed analogously to one of the possible control valve drives 23. The two drives 23, 33 are synchronised with one another and with a timing of the explosions in the explosion space 11.

The closure valve 31 closes the discharge opening 17 on a closure valve annular surface 32.

With the closure valve 31, it is possible to ensure that only a small amount of gas escapes through the exit nozzle 15, on account of a rapid opening before the ignition of the main explosion. A difficulty that occurs in the case of a combined closure and control valve is solved by way of this: with such a valve, according to a variant of the operating method, the valve should firstly be closed in a complete and sealed manner, and should then open very rapidly, until the optimal nozzle entry area 12 is present with the explosion, and should then follow the idea area ratio in a relatively slow manner by way of enlarging the nozzle entry area 13, and finally close very rapidly again.

The control valve 21 on ignition, for example, can already be opened somewhat due to the separation of the closure function from the control function, on account of the separate closure valve 31 and the separate movability of the two valves, and does not therefore have to be moved in a particularly rapid manner prior to this, and be braked to the slower movement for following the ideal area ratio. In turn, the closure valve 31 can be opened very rapidly, in particular by way of the drive by way of an auxiliary explosion.

The drive of the control valve drive 23 and/or of the closure valve drive 33 can be effected by any type of force, thus for example pneumatically, hydraulically, by way of a crank drive or a cam drive or with an (auxiliary) explosion drive, as described in EP 2 319 036 A2. Several drive principles can also be combined with one another, as is represented by way of example in FIG. 4: thus an (auxiliary) explosion drive 231 with an auxiliary ignition device 235, for example a spark plug, and with an auxiliary explosion chamber 236 can be used for the initial acceleration of the control valve 21 on opening (The explosion is led to the explosion space 11 by the delay conduit 232). A cam drive or a cam shaft 234 or a crank drive can then be used for braking and/or for the control of the speed of the control valve 21. The movement of the cam shaft can be stabilised with a separate drive, for example electrically or pneumatically or hydraulically, etc. and/or be stabilised by a flywheel. A gas pressure spring 233 can moreover be applied for braking the movement of the control valve 21. Thereby, the cam drive 234 or the crank drive can be arranged mechanically in parallel (as drawn in the figure) or in series with the gas pressure spring 233.

The device according to the FIG. 1 or 2 can be operated in the following manner:

1. Filling the explosion space 11 with the explosive material, for example with a mixture of an oxidiser and a fuel. The control valve 21 or the closure valve 31, if present, is closed in this position, and one or more filling valves 18 are opened. If air is used as an oxidiser, then this can originate from the compressor of a gas turbine, an accumulator device or any other assembly creating a pressure. It is also conceivable for the ram pressure of an aircraft to compact the air. Pure oxygen can originate from a pressure tank in the case that this is applied.
2. The filling valve or valves 18 are closed shortly before the ignition of the explosion in the explosion space 11, and the control valve 21 can be opened to such an extent that the area ratio ε between the nozzle end and the nozzle neck corresponds to an ideal area ratio at the pressure before the ignition.
3. Igniting the explosive material. The closure valve 31, if present, is opened, otherwise the control valve 21 is opened. The high explosion temperature can render it necessary for the respective valve to be somewhat opened even before the ignition of the explosion. The outflow of the combustion gases begins, and the pressure in the explosion space 11 drops. After the ignition, the nozzle neck cross section or the nozzle entry area 13, over time and with a reducing pressure in the explosion space 11, is adjusted at least approximately according to the ideal area ratio ε, in accordance with a cross-sectional contour or a contour of the control valve needle 22, by way of a valve path, thus by way of displacing the control valve 21 in the axial direction with respect to the exit nozzle 15. The combustion gases are accelerated in the nozzle neck up to the speed of sound and subsequently in the divergent nozzle part accelerated further up to the maximal achievable supersonic speed. The control valve 21 is opened further in a continuous manner, until the nozzle entry area 13 is completely released and the minimal area ratio is reached and the explosion space 11 has been largely emptied.

4. The control valve 21 or the closure valve 31 is closed when the pressure ratio of the ambient pressure and the combustion chamber pressure has dropped below the critical pressure ratio, and the device is ready for the next cycle.

The invention claimed is:

1. A device for repeated production of explosions, comprising an explosion space, a feed conduit for feeding a flowable, explosive material, a discharge opening for directed discharge of a gas pressure produced by ignition of the explosive material in the explosion space, and a movable closure element for partial or complete closure of the discharge opening,
   wherein the device comprises an exit nozzle with a nozzle entry neck area and a nozzle exit area, as well as an actuation device that is designed, after an opening of the discharge opening and an outflow of explosion gases through the exit nozzle, to adjust an area ratio between the nozzle entry neck area and the nozzle exit area, said area ratio at least approximately following an ideal area ratio for production of a maximal exit speed of the explosion gases, the ideal area ratio being in direct dependence on the gas pressure in the explosion space such that changes in the ideal area ratio track changes in said gas pressure,
   wherein the device comprises a control valve for the variation of the nozzle entry neck area, and the actuation device is a control valve drive that controls a movement of the control valve for adjusting the nozzle entry neck area at least approximately in accordance with the ideal area ratio, the ideal area ratio being in direct dependence on the gas pressure in the explosion space such that changes in the ideal area ratio track changes in said gas pressure, the control valve being either integral or separate from the moveable closure element, and
   wherein the actuation device comprises a drive means for causing an opening movement of the control valve, said drive means comprising an auxiliary explosion device, in which an auxiliary explosion produces a force that assists the opening movement.

2. The device according to claim 1, wherein the control valve comprises a control valve needle, and the nozzle entry neck area is determined by the position of the control valve needle with respect to the discharge opening.

3. The device according to claim 2, wherein the control valve needle has an outer contour that tapers to a valve tip and has an at least approximate conical outer contour.

4. The device according to claim 1, wherein the control valve and a valve seat form a convergent-divergent part of the exit nozzle.

5. The device according to claim 1, wherein the actuation device comprises a braking means for delaying an opening movement of the control valve, said braking means comprising a gas pressure spring or a cam shaft or the gas pressure spring in combination with the cam shaft.

6. The device according to claim 1, wherein the closure element is configured to temporarily completely close the discharge opening.

7. The device according to claim 1, wherein the control valve acts as the closure element for the partial or complete closure of the discharge opening.

8. The device according to claim 1, wherein the moveable closure element comprises a closure valve which acts for the partial or complete closure of the discharge opening.

9. The device according to claim 8, wherein the control valve and the closure valve are arranged concentrically to one another.

10. A method for repeated production of explosions, with repeated implementation of the following steps:
    feeding a flowable, explosive material into an explosion space, wherein a discharge opening of the explosion space is at least partly closed by way of a movable closure element, and producing an overpressure in the explosion space with respect to an ambient pressure;
    opening the discharge opening;
    igniting the explosive material in the explosion space;
    discharging explosion gases through the discharge opening and an exit nozzle;
    adjusting a nozzle entry neck area of the exit nozzle so that an area ratio between the nozzle entry neck area and a nozzle exit area of the exit nozzle is at least approximately following an ideal area ratio for the production of a maximal exit speed of the explosion gases, the ideal area ratio being in direct dependence on a dropping gas pressure in the explosion space such that changes in the ideal area ratio track changes in said gas pressure;
    at least partially closing the discharge opening by way of the movable closure element;
    wherein the step of adjusting the area ratio is effected by way of moving a control valve, which varies the nozzle entry neck area of the exit nozzle, the control valve being either integral or separate from the moveable closure element;
    wherein moving the control valve is effected by way of an actuation device, comprising a drive means that causes an opening movement of the control valve, said drive means comprising an auxiliary explosion device, in which an auxiliary explosion produces a force that assists the opening movement.

11. The method according to claim 10, wherein the step of the opening of the discharge opening takes place before the step of the ignition.

12. The method according to claim 10, wherein the ignition of the explosive material in the explosion space is effected by way of leading an explosion out of the auxiliary explosion device through a conduit to the explosion space.

* * * * *